(12) United States Patent
Chan

(10) Patent No.: US 7,181,532 B1
(45) Date of Patent: Feb. 20, 2007

(54) SCALABLE POLICY SERVER

(75) Inventor: Kwok Ho Chan, Dunstable, MA (US)

(73) Assignee: Nortel Networks Limited (CA)

( * ) Notice: Subject to any disclaimer, the term of this patent is extended or adjusted under 35 U.S.C. 154(b) by 918 days.

(21) Appl. No.: 09/859,702

(22) Filed: May 17, 2001

Related U.S. Application Data

(60) Provisional application No. 60/205,706, filed on May 19, 2000.

(51) Int. Cl.
*G06F 15/173* (2006.01)

(52) U.S. Cl. ............... 709/242; 709/225; 709/228; 709/229; 709/237; 709/238

(58) Field of Classification Search ........ 709/230–239, 709/200, 242
See application file for complete search history.

(56) References Cited

U.S. PATENT DOCUMENTS

| | | | | |
|---|---|---|---|---|
| 5,870,561 | A | * 2/1999 | Jarvis et al. ............... | 709/238 |
| 6,167,445 | A | * 12/2000 | Gai et al. .................. | 709/223 |
| 6,286,052 | B1 | * 9/2001 | McCloghrie et al. ....... | 709/238 |

OTHER PUBLICATIONS

Cain et al. "Internet Group Management Protocol, Version 2," Nov. 1997, RFC# 2236, http://www.faqs.org/rfcs/rfc2236.html.*
Blake et al. "An Architecture for Differentiated Services," Dec. 1998, RFC# 2475, http://www.faqs.org/rfcs/rfc2475.html.*
Evans, Shara. "Standards Watch: 802.1p—A Start at Ethernet Prioritization," Sep. 1998, http://www.telsyte.com.au/standardswatch/802.1p.htm.*
Braden, R., et al, "Resource Reservation Protocol (RSVP)—Version 1 Message Processing Rules", RFC 2209, Sep. 1997.
Braden, R., et al, Resource ReSerVation Protocol (RSVP)—Version 1 Functional Specification, 22.9 14 (1), Sep. 1997. IETF Request for Comments 2205.
Durham, D., et al, The COPS (Common Open Policy Service) Protocol, RFC 2748, Jan. 2000.
Herzog, S., et al, "COPS Usage for RSVP", RFC 2749, Jan. 2000.
Herzog, S, "RSVP Extensions for Policy Control", RFC 2750, Jan. 2000.
Yadav, S., et al, "Identity Representation for RSVP", RFC 2752, Jan. 2000.
"COPS for RSVP", Cisco While Paper, http://www.cisco.com/universcd/cc/td/doc/product/software/ios121/121newft/121tl/copsrsvp.htm , posted Mar. 30, 2000.

* cited by examiner

*Primary Examiner*—Rupal Dharia
*Assistant Examiner*—Nicholas Taylor
(74) *Attorney, Agent, or Firm*—McGuiness & Manaras LLP

(57) ABSTRACT

A method and apparatus for establishing communication (across a network) between a first network device and a second network device apply policy data received from a policy device (e.g., a policy server), thus offloading significant functionality from the policy device. Offloading such functionality reduces the processing required by the policy device, thus improving network performance. Such systems permit network access admission control in a scalable manner.

20 Claims, 3 Drawing Sheets

SCALABLE POLICY SERVER

This application claims priority from U.S. provisional patent application 60/205,706, filed May 19, 2000, which is incorporated herein by reference.

FIELD OF THE INVENTION

The invention generally relates to computer networks and, more particularly, to establishing communications across a network.

BACKGROUND ART

Network devices communicate across a network (e.g., the Internet) in accord with many known protocols. One protocol, known as the Resource Reservation Protocol (the "RSVP protocol"), enables one or more network devices to reserve bandwidth based upon some pre-specified network policy. The policy may be based upon any desired characteristic, such as the identity of some given user (e.g., an executive of a corporation requesting data) or network device (the prior noted executive's computer), or the type of data being transmitted (e.g., video on demand).

When utilizing the RSVP protocol, a sending access device (e.g., a personal computer) first transmits a "path message" toward a receiving access device across the network. Among other things, the path message typically includes a request for a specified amount of bandwidth (e.g., a Quality of Service level), and some policy data (e.g., identity of sender, type of data, etc . . . ). A network device, such as a router, between the two access devices then receives the path message, and communicates with a policy server to determine some preliminary policy issues for the two access devices. For example, the policy server may indicate the broadest policy parameters that the two access devices may utilize. The router then forwards the path message to the receiving access device.

Upon receipt of the path message, the receiving access device responsively generates and transmits a reservation message toward the sending access device. Among other data, the reservation message typically includes data indicating the amount of bandwidth that the receiving access device can handle (within the amount requested in the path message), and other policy data. The router receives the reservation message before the sending access device receives such message. The router then communicates with the policy server once again, requesting that the policy server apply the policy to the information in the two messages. The policy server responsively applies the policy, and then forwards such applied policy to the router. Upon receipt from the policy server, the router forwards the applied policy to the sending access device. The sending access device then utilizes the applied policy to mark specified data packets transmitted between the two access devices. Intermediate network devices thus may process such data packets in accord with the applied policy.

In commonly used systems, one policy server is utilized with many routers. Accordingly, problems can arise when many users are indirectly utilizing a single policy server. Specifically, processing both the path message and the reservation message, as well as applying the policy to the specified data, can degrade network performance.

SUMMARY OF THE INVENTION

In accordance with one aspect of the invention, a method and apparatus for establishing communication (across a network) between a first network device and a second network device apply policy data received from a policy device (e.g., a policy server), thus offloading significant functionality from the policy device. In illustrative embodiments, this policy application is executed by a third network device. Offloading such functionality reduces the processing required by the policy device, thus improving network performance. To that end, the method and apparatus store policy data in a storage device that is accessible by the third network device. The policy data is provided by the policy device in response to a communication request message from the first network device to the second network device, and is specifically related to communication between the first network device and the second network device. The third network device receives a confirmation message sent by the second network device in response to the communication request message. The confirmation message indicates that the second network device is prepared to receive communications from the first network device. The stored policy data and the confirmation message are forwarded from the third network device to the first network device.

In representative embodiments, the communication request may be a path message, and the confirmation message may be a reservation message. Such messages thus are transmitted in accord with the well known Resource Reservation Protocol (the "RSVP protocol"). In such case, the policy device may be a policy server, the first network device may be a network access device (e.g., a computer, network appliance, cell phone, or other device that permits a user to access a network), and the network may be the Internet. In addition, the third network device may be, for example, a router.

A representative embodiment further marks data traffic directed from the first network device to the second network device according to the stored policy. This data traffic may include, without limitation, User Datagram Protocol (UDP) or Transmission Control Protocol (TCP) traffic, or both. The data traffic may also include streaming video or audio. The third network device may be remote from the policy device, and may include a computer system with local storage that includes the storage device.

In a specific embodiment, the stored policy data determines a Quality of Service (QoS) characteristic (e.g., reserved bandwidth) that is assigned to the communications from the first network device to the second network device. The policy device may use the Common Open Policy Service (COPS) protocol. The stored policy data may also include either a Differentiated Services Code Point (DSCP) or 802.1p signaling marking, or both.

BRIEF DESCRIPTION OF THE DRAWINGS

The present invention will be more readily understood by reference to the following detailed description taken with the accompanying drawings, in which.

DETAILED DESCRIPTION OF SPECIFIC EMBODIMENTS

Figure 1:
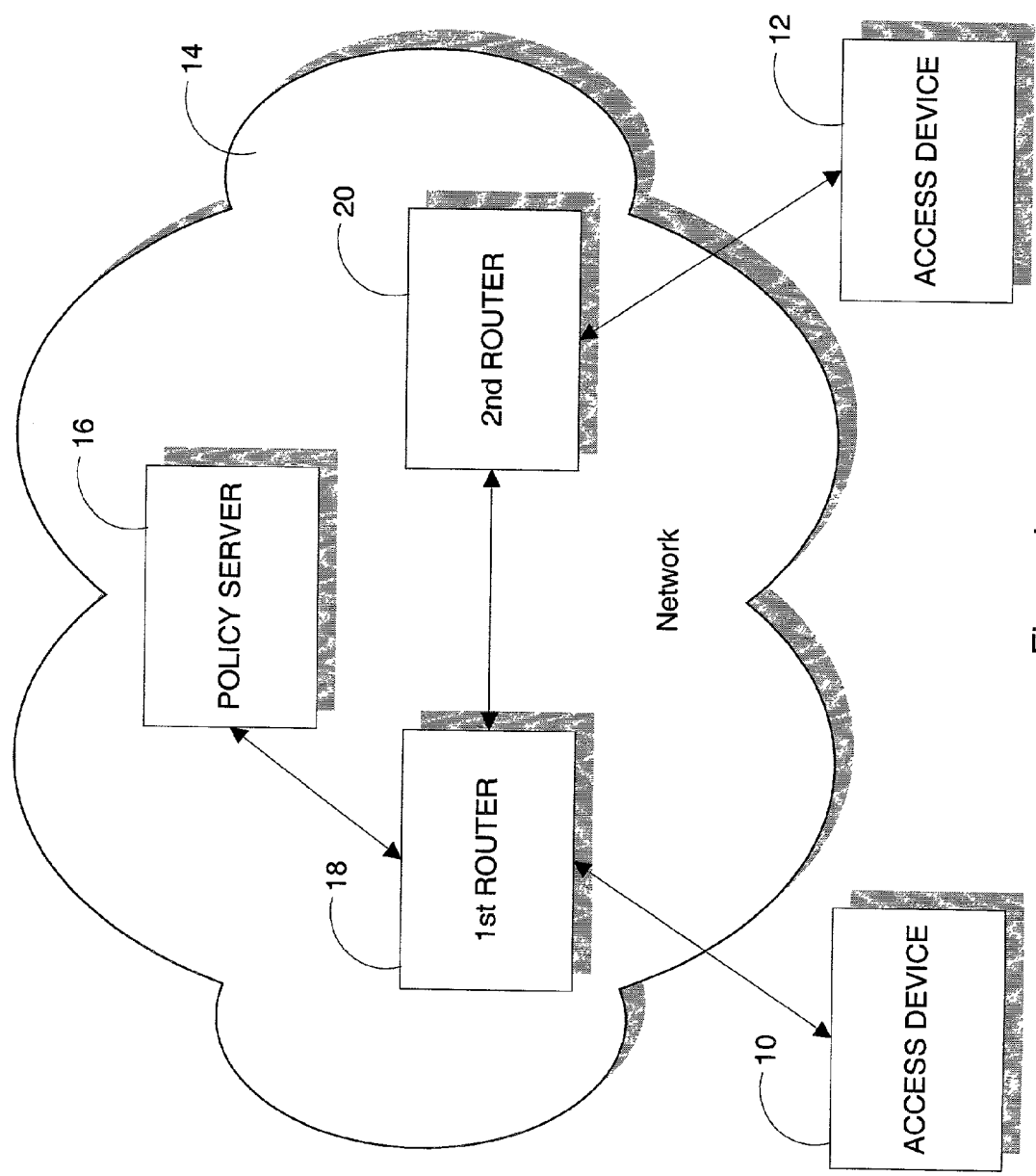
FIG. 1 schematically shows a representative network arrangement that may be utilized to implement various embodiments of the invention.

FIG. 1 schematically shows an exemplary network arrangement that may be utilized with illustrative embodiments of the invention. In particular, the network arrangement includes a sending access device 10 that is attempting to establish a communication link/channel (hereinafter "link") with a receiving access device 12 across a large scale, public or private network 14 (e.g., the Internet or an intranet). For example, the sending access device 10 may be attempting to establish a link for transmitting streaming video data to the receiving access device 12. The access devices 10 and 12 may be any type of device that is capable of accessing a network 14, such as a computer system, server, Internet appliance, modem, cellular telephone, wireless access product, local area network access product, virtual private network access product, or Internet service provider access product. Note that this listing is exemplary and not intended to limit the various embodiments of the invention. It also should be noted that the access devices 10 and 12 may be referred to as "network devices."

Among other things, the network 14 includes a policy server 16 for facilitating policy driven processes (discussed below), and first and second routers 18 and 20. Illustrative embodiments implement the well known Resource Reservation Protocol (the "RSVP protocol") over the Internet Protocol (the "IP protocol"). It should be noted, however, that although discussed in terms of the RSVP protocol and the IP protocol, illustrative embodiments may be applicable to other similar protocols. Accordingly, discussion of IP and RSVP are not intended to limit the various embodiments of the invention.

Figure 2A:
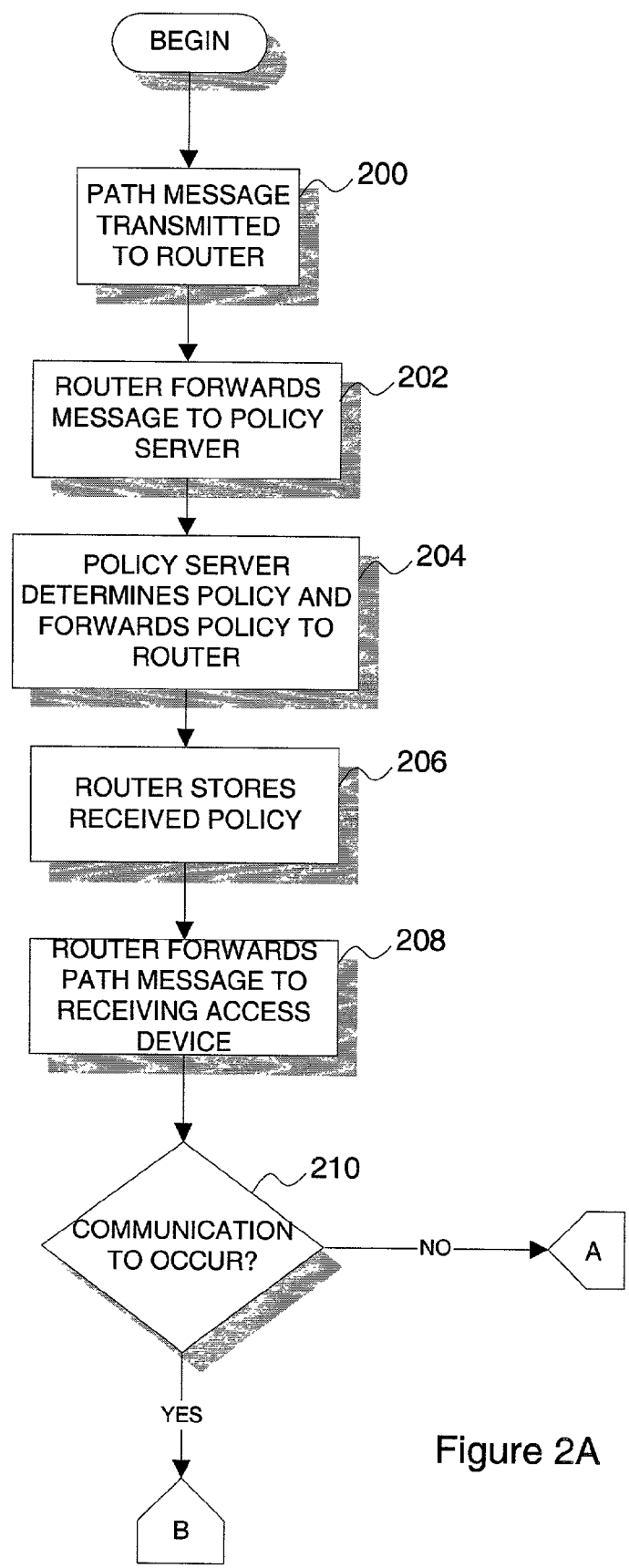
FIGS. 2A and 2B show a typical process of establishing communication between the two access devices shown in FIG. 1.
Figure 2B:
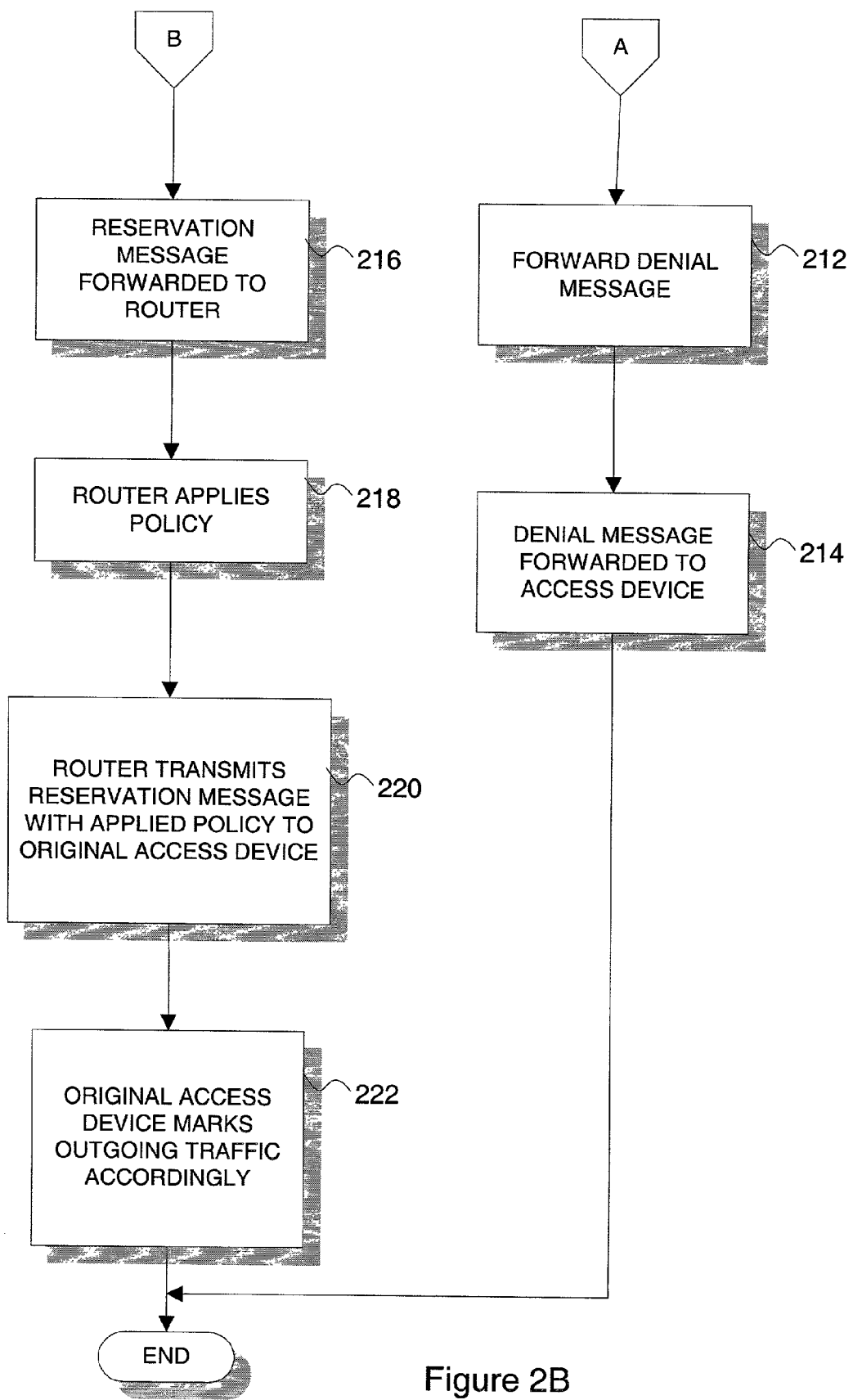

FIGS. 2A and 2B show a process of establishing a communication link between the sending and receiving access devices 10 and 12. Such link is a one-way link from the sending access device 10 to the receiving access device 12 for transmitting one designated information flow. Two-way data transmission can be executed between the two access devices 10 and 12, however, if each access device 10 and 12 executes the process for its respective transmission flows. An information flow is defined by the application generating the data to be transmitted. For example, in a video conference between the two access devices 10 and 12, the video data can be considered a first flow, while the voice data can be considered a second flow. Accordingly, each access device 10 and 12 executes the process one time for the first (video) flow, and a second time for the second (voice) flow. As a further example, both the video data and voice data of the previous example can be considered a single information flow.

In illustrative embodiments of the process, the two access devices 10 and 12 attempt to reserve a specified bandwidth (complying with well known Quality of Service ("QoS") processes) for transmitting an information flow from the sending access device 10 to the receiving access device 12. Accordingly, if successfully established, such specified bandwidth is "guaranteed" to the two access devices 10 and 12 when they communicate. The process begins at step 200, in which an RSVP path message is generated and transmitted by the sending access device 10 toward the receiving access device 12 via the first router 18. In illustrative embodiments, the path message signals a QoS requirement to the network 14. To that end, the path message may include:

- a session object describing the receiving access device 12 via a receiver access device IP address, port number, and protocol type;
- a sender template object describing the sending access device 10 via the sender access device IP address and port number; and
- a policy object that carries policy information. This object can carry many different types of information. For example, such information can include data regarding inter-operability with the well-known Microsoft Windows 2000™ operating system (e.g., user ID and application ID information).

Once the first router 18 receives the path message, the process continues to step 202, in which the path message is forwarded to the policy server 16. For example, if the path message is new (i.e., it is the first path message for the desired information flow) or has changed (i.e., it is different from a previous path message received for the desired information flow), then the first router 18 notifies the policy server 16 as such by utilizing a Common Open Policy Service Protocol request message (a "COPS" request message). Specifically, a new COPS handle is used for a new path message, while an existing COPS handle is used for a changed path message. The COPS request message carries the path message to fully communicate the specific data to the policy server 16.

Once it receives the COPS request message, the policy server 16 determines and applies the relevant policy, and forwards such applied policy to the first router 18 (step 204). Specifically, the policy server 16 determines:

- the receiving access device 12 from the receiver IP address, receiver port number, and protocol type in the session object;
- the sender access device 10 from the sender IP address and sender port number in the sender template object;
- the specific user of the sending access device 10 from the user ID information in the policy object; and
- specific application and sub-application data from the application ID information in the policy object.

Based upon this and other information, the policy server 16 makes its policy decision and selects a DSCP (differentiated services code point) and/or 802.1p priority marking. Accordingly, as noted above with regard to step 204, the policy server 16 forwards a COPS decision message with a DSCP and/or 802.1p marking to the first router 18.

Upon receipt of the COPS decision message, the first router 18 installs the DSCP and/or 802.1p marking information in its path state (step 206). Stated another way, the applied policy is stored (as state information) in a memory device that is accessible by the first router 18. The router then forwards the path message to the receiving access device 12 (step 208).

After it receives the path message, the receiving access device 12 determines at step 210 if it is to communicate with the sending access device 10. For example, the user on the receiving access device 12 may not have the need or desire to communicate with the sending access device 10. If the receiving access device 12 is not to communicate with the sending access device 10, then the process continues to off page connector "A." Conversely, if the receiving access device 12 is to communicate with the sending access device 10, then the process continues to off page connector "B." Both off page connectors "A" and "B" continue on FIG. 2B.

From off page connector "A," the process continues to a denial process, in which a denial message is forwarded to the first router 18 (step 212), and then to the sending access device 10 (step 214). In alternative embodiments, communication is denied merely by the receiving access device 12 not responding to the path message within a preselected time interval.

From off page connector "B," the process continues to step 216, in which a RSVP ResV message ("reservation message") is forwarded to the first router 18. The first router 18 consequently applies the policy upon receipt of the reservation message (step 218). To that end, the first router 18 first matches the reservation message with its corresponding path message based upon network traffic flow. After the messages are matched, the first router 18 sends the reservation message (with the DSCP marking in a DCLASS object and/or 802.1p marking in a TCLASS object) toward the sending access device 10 (step 220). Accordingly, the policy is applied by the first network device without the further assistance of the policy server 16. Moreover, the reservation message is not processed or even received by the policy server 16.

Upon receipt of the reservation message with the applied policy, the sending access device 10 begins marking the relevant network traffic with the specified DSCP and/or 802.1p marking (step 222). Various network devices in the network 14 thus use QoS resources for the relevant network traffic flow based upon the DSCP and/or 802.1p marking.

Offloading the reservation message processing to the first router 18 reduces the processing required by the policy server 16. Accordingly, the policy server 16 may substantially simultaneously process more path messages than those policy servers that process both the path message and reservation message. Consequently, a single policy server utilizing illustrative embodiments is scalable to process more users and more network devices (e.g., routers with the described functionality of the first router 18). Of course, discussion of a router is exemplary only. For example, the first router 18 may be any network device, such as a switch or a bridge. Additionally, instead of being executed by the first router 18, the second router 20 or other router in the network 14 could execute the noted functions described in FIGS. 2A and 2B. It is preferable, however, that a router that serves as an entry point into the network 14 for the sending access device 10 (e.g., the first router 18) be utilized to execute illustrative embodiments.

Illustrative embodiments may be implemented for a variety of network products. For example, illustrative embodiments may be utilized for massive deployment of Voice over IP, and for allowing access to the IP backbone that serves a wireless network. Protocols other than RSVP may also be used. For example, IGMP can be used as signaling for access control to a multimedia distribution network served by an IP-based backbone for digital video distribution (e.g., video on demand and digital pay per view television). Notice that when used with IGMP, the receiver of information issues the request for information. For RSVP, the sender of information issues the request to send. Illustrative embodiments permit these and other technologies to be deployed in a wide scale without being limited by the scalability of the policy server 16 for access, billing, and other types of policies that need to be applied.

Some embodiments of the invention may be implemented in any conventional computer programming language. For example, illustrative embodiments may be implemented in a procedural programming language (e.g., "C") or an object oriented programming language (e.g., "C++"). Alternative embodiments of the invention may be implemented in discrete hardware elements, and/or as preprogrammed hardware elements (e.g., application specific integrated circuits and digital signal processors), or other related components.

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions preferably embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Although various exemplary embodiments of the invention have been disclosed, it should be apparent to those skilled in the art that various changes and modifications can be made which will achieve some of the advantages of the invention without departing from the true scope of the invention.

What is claimed is:

1. A method of a computer network in establishing communication between a first network device and a second network device, the network including a policy device that controls policy data relating to the communication, the method comprising:

storing policy data in a storage device accessible by a third network device, the policy data being:
      (i) provided by the policy device in response to a resource reservation request message from the first network device to the second network device, and
      (ii) specifically related to communication between the first network device and the second network device;
    receiving with the third network device a confirmation message sent by the second network device in response to the resource reservation request message, the confirmation message indicating that the second network device is prepared to have communications with the first network device; and
    forwarding from the third network device to the first network device the stored policy data with the confirmation message.

2. The method as defined by claim 1, wherein the network devices are executing the RSVP protocol.

3. The method as defined by claim 1, wherein the network devices are executing the IGMP protocol.

4. The method as defined by claim 1, further comprising:
    marking data traffic directed from the first network device to the second network device according to the stored policy.

5. The method as defined by claim 1, wherein the policy device uses Common Open Policy Service (COPS) protocol.

6. The method as defined by claim 1, wherein the stored policy data includes a Differentiated Services Code Point (DSCP) marking.

7. The method as defined by claim 1, wherein the stored policy data includes an 802.1p signaling marking.

8. An apparatus in a computer network for establishing communication between a first network device and a second network device, the network including a policy device that controls policy data relating to the communication, the apparatus comprising:
   a storage module for storing policy data in a storage device accessible by a third network device, the policy data being:
   (i) provided by the policy device in response to a resource reservation request message from the first network device to the second network device, and
   (ii) specifically related to communication between the first network device and the second network device; and
   a message interface module in the third network device that:
   (i) receives a confirmation message sent by the second network device in response to the resource reservation request message, the confirmation message indicating that the second network device is prepared to have communications with the first network device, and
   (ii) forwards to the first network device the stored policy data with the confirmation message.

9. The apparatus as defined by claim 8, wherein the network devices are executing the RSVP protocol.

10. The apparatus as defined by claim 8, wherein the network devices are executing the IGMP protocol.

11. The apparatus as defined by claim 8, wherein the policy device uses Common Open Policy Service (COPS) protocol.

12. The apparatus as defined by claim 8, wherein the stored policy data includes a Differentiated Services Code Point (DSCP) marking.

13. The apparatus as defined by claim 8, wherein the stored policy data includes an 802.Ip signaling marking.

14. A computer program product for use on a computer system in establishing communication in a computer network between a first network device and a second network device, the network including a policy device that controls policy data relating to the communication, the computer program product comprising a computer usable medium having computer readable program code thereon, the computer readable program code comprising:
   program code for storing policy data in a storage device accessible by a third network device, the policy data being:
   (i) provided by the policy device in response to a resource reservation request message from the first network device to the second network device, and
   (ii) specifically related to communication between the first network device and the second network device;
   program code for receiving with the third network device a communication message sent by the second network device in response to the resource reservation request message, the confirmation message indicating that the second network device is prepared to have communications with the first network device; and
   program code for forwarding from the third network device to the first network device the stored policy data with the confirmation message.

15. The computer program product as defined by claim 14, wherein the network devices are executing the RSVP protocol.

16. The computer program product as defined by claim 14, wherein the network devices are executing the IGMP protocol.

17. The computer program product as defined by claim 14, further comprising: program code for marking data traffic directed from the first network device to the second network device according to the stored policy.

18. The computer program product as defined by claim 14,
   wherein the policy device uses Common Open Policy Service (COPS) protocol.

19. The computer program product as defined by claim 14,
   wherein the stored policy data includes a Differentiated Services Code Point (DSCP) marking.

20. The computer program product as defined by claim 14, wherein the stored policy data includes an 802.Ip signaling marking.

* * * * *